US012627217B2

(12) United States Patent　　(10) Patent No.: US 12,627,217 B2
Kolar et al.　　　　　　　　　　　(45) Date of Patent:　May 12, 2026

(54) MODULAR RECONFIGURABLE ELECTRICAL AC/DC CONVERTER

(71) Applicant: PRODRIVE TECHNOLOGIES INNOVATION SERVICES B.V., Son en Breugel (NL)

(72) Inventors: Johann Walter Kolar, Zürich (CH); David Menzi, Burgdorf (CH); Jordi Everts, Son en Breugel (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 749 days.

(21) Appl. No.: 18/042,339

(22) PCT Filed: Aug. 20, 2021

(86) PCT No.: PCT/EP2021/073198
§ 371 (c)(1),
(2) Date: Feb. 21, 2023

(87) PCT Pub. No.: WO2022/038288
PCT Pub. Date: Feb. 24, 2022

(65) Prior Publication Data
US 2023/0336072 A1　Oct. 19, 2023

(30) Foreign Application Priority Data

Aug. 21, 2020　(NL) ...................................... 2026324

(51) Int. Cl.
*H02M 1/10* (2006.01)
*H02J 7/00* (2006.01)
(Continued)

(52) U.S. Cl.
CPC ............... *H02M 1/10* (2013.01); *H02J 7/007* (2013.01); *H02M 7/2173* (2013.01); *H02M 7/23* (2013.01); *H02J 2207/20* (2020.01)

(58) Field of Classification Search
CPC ......... H02M 1/10; H02J 7/007; H02J 2207/20
See application file for complete search history.

(56) References Cited

U.S. PATENT DOCUMENTS

| | | |
|---|---|---|
| 2010/0091529 A1 | 4/2010 | Jakeman et al. |
| 2011/0261591 A1 | 10/2011 | Krause |

(Continued)

FOREIGN PATENT DOCUMENTS

| | | |
|---|---|---|
| CN | 111355287 A | 6/2020 |
| WO | 2015193003 A1 | 12/2015 |
| WO | 2019057771 A1 | 3/2019 |
| WO | 2020007767 A1 | 1/2020 |
| WO | 2020079019 A1 | 4/2020 |

OTHER PUBLICATIONS

International Search Report and Written Opinion of the International Searching Authority from the European Patent Office, in PCT/EP2021/073198 dated Nov. 30, 2021, which is an international application corresponding to this U.S. application.

(Continued)

*Primary Examiner* — Robert Grant
(74) *Attorney, Agent, or Firm* — Kolitch Romano Dascenzo Gates LLP

(57) ABSTRACT

An electrical converter may include AC terminals, a first and second DC terminal, and converter modules. Each of the converter modules has an AC node. The second DC terminal forms a common node of the converter modules. A connection between the AC nodes of the converter modules and the AC terminals is reconfigurable allowing the electrical converter to operate according to a first mode of operation converting between a first AC signal having a first plurality of phase voltages and the DC signal, in which the converter (Continued)

modules are grouped in first groups, and according to a second mode of operation converting between a second AC signal having a single-phase voltage and the DC signal, in which the converter modules are rearranged in second groups. The electrical converter is configured to operate multiple converter modules assigned to a same group of the first groups and the second groups in parallel.

20 Claims, 14 Drawing Sheets

(51) Int. Cl.
  *H02M 7/217*      (2006.01)
  *H02M 7/23*       (2006.01)

(56)                References Cited

U.S. PATENT DOCUMENTS

| | | | |
|---|---|---|---|
| 2016/0149507 A1 | 5/2016 | Lei et al. | |
| 2017/0288423 A1* | 10/2017 | Wu | H02J 7/0019 |
| 2020/0195165 A1* | 6/2020 | Shinoda | H02M 7/2173 |
| 2021/0146782 A1 | 5/2021 | Lehn et al. | |

OTHER PUBLICATIONS

Antivachis, Michael, et al.; "Three-phase buck-boost Y-inverter with wide DC input voltage range," obtained from 2018 IEEE Applied Power Electronics Conference and Exposition (APEC), pp. 1492-1499, Mar. 4, 2018.

* cited by examiner

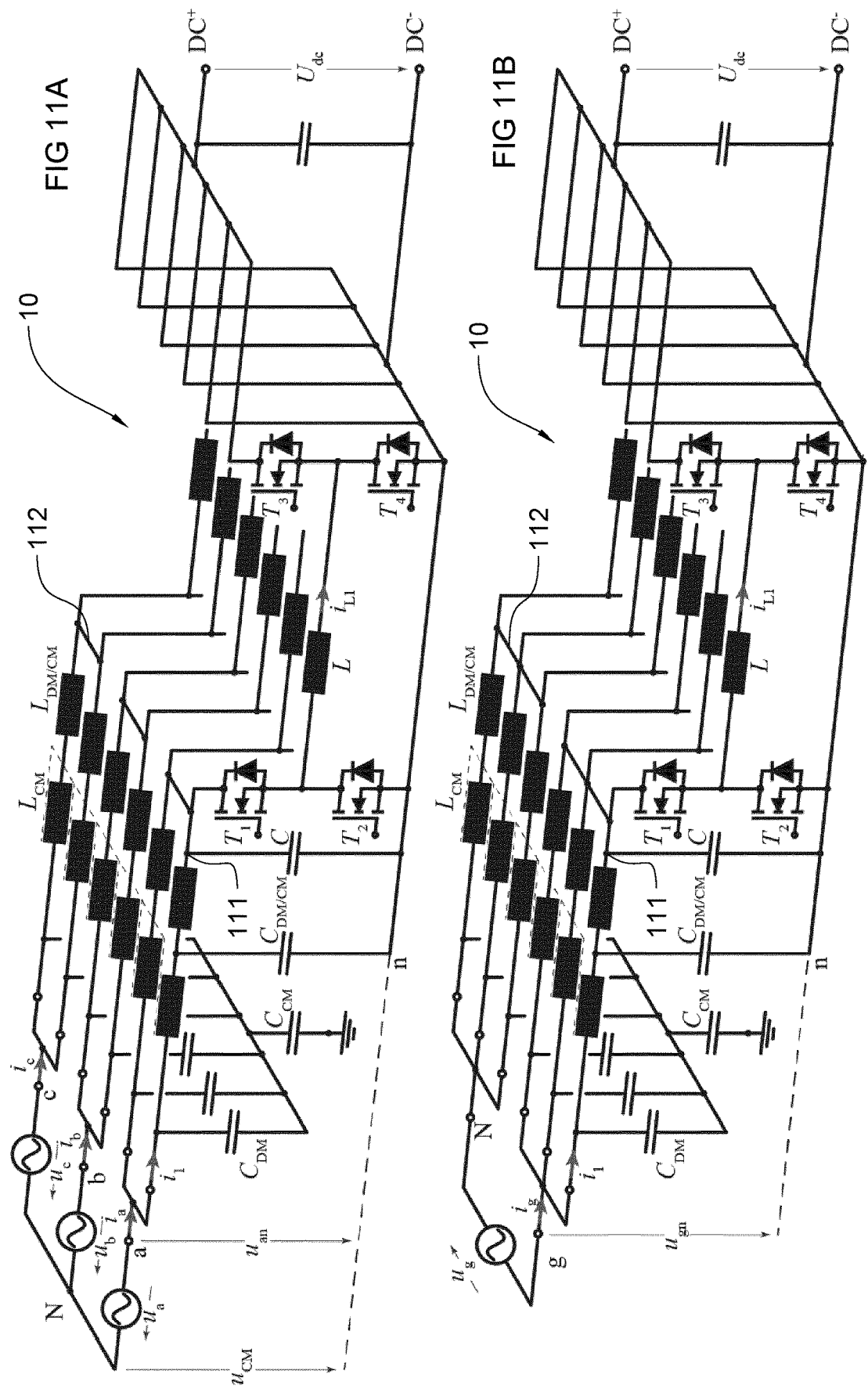

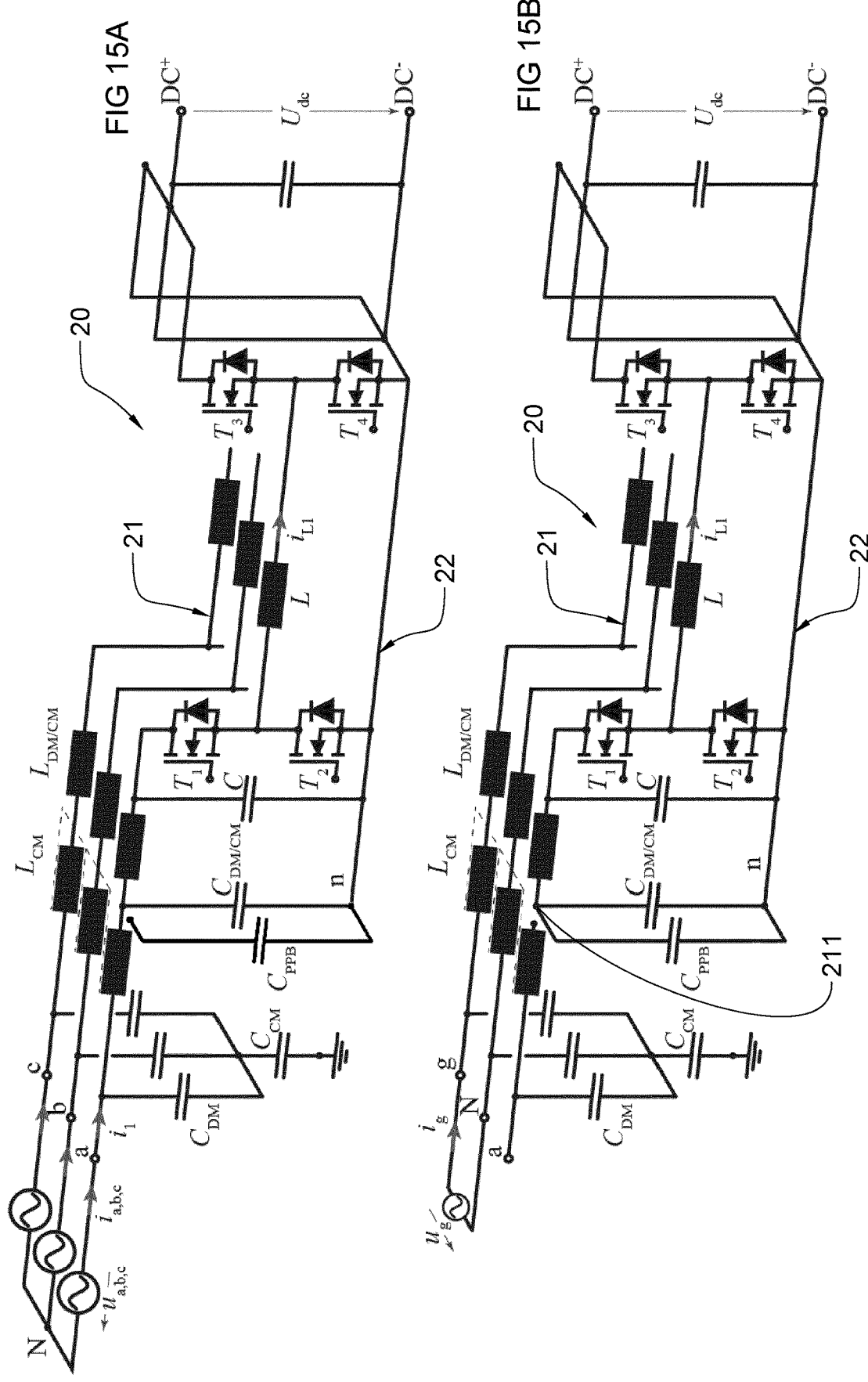

MODULAR RECONFIGURABLE ELECTRICAL AC/DC CONVERTER

TECHNICAL FIELD

The present disclosure is related to an electrical AC/DC converter, allowing both single phase and three phase AC to DC operation. In particular, the present disclosure is related to such electrical converters allowing buck and boost capability.

BACKGROUND

In order to support further proliferation of Electric Vehicles (EVs), battery charger systems should allow for nominal power operation both in the case when attached to the European three-phase grid (e.g. 400 Vrms line-to-line voltage), as well as the US American split single-phase grid (e.g. 240 Vrms Vrms line-to-line voltage for a split single phase connection of 2×120 Vrms line-to-neutral voltage). Furthermore, charging systems are required to cover a wide DC output voltage range of typically 400 V-750 V in order to allow compatibility with various EV battery nominal voltages, such that buck-boost capability is required.

A typical three-phase rectifier system can operate on the single-phase grid by attaching one phase terminal to the (first) line conductor and a second phase terminal to the neutral/second line conductor, where one phase terminal is not connected. As a result, only approximately ⅓ of the nominal output power can be provided in single-phase operation without overdimensioning of the employed components.

WO 2020/079019 discloses an AC/DC converter topology allowing both three-phase and single-phase operation. In single-phase operation, the three phases of the rectifier are operated in parallel and connected to the line conductor, while the neutral conductor is connected to a low-frequency unfolder bridge-leg. A four phase common mode choke is required to avoid core saturation in single phase operation. This topology hence allows full power conversion both in three-phase and in single-phase operation. However, this topology comprises a single-stage Power Factor Correction (PFC) rectifier, which is limited to buck or boost operation and hence requires an additional DC/DC converter stage to comply with a wide DC output voltage range.

Antivachis M. et al., Three-Phase Buck-Boost Y-Inverter with Wide DC Input Voltage Range, *Proc. of the IEEE Applied Power Electronics Conference and Exposition (APEC)*, pp. 1492-1499, March 2018 discloses a phase-modular three-module Y-Inverter allowing three-phase boost and buck operation without the need for an additional DC/DC converter stage, leading to an ultra-compact and highly efficient converter realization. However, the Y-inverter only allows for three-phase operation.

SUMMARY

It is therefore an aim of the present disclosure to provide an electrical AC/DC converter allowing both three-phase and single-phase AC/DC conversion with improved system performance compared to prior art AC/DC converters, and possibly a reduced hardware count and/or without the need of component overdimensioning. It is an aim of the present disclosure to provide an electrical converter of the above type which allows to maintain modularity in three-phase as well as single-phase operation.

According to a first aspect of the present disclosure, there is therefore provided an electrical converter as set out in the appended claims. Electrical converters as described herein are operable for converting between an AC signal and a DC signal, and are advantageously used for rectifier operation, inverter operation, or both, i.e. for bidirectional power flow.

An electrical converter according to the present disclosure comprises a plurality of AC terminals, a first and a second DC terminal and a plurality of converter modules. Each of the plurality of converter modules comprises an AC node, a first converter stage comprising a first switch node, a second converter stage comprising a second switch node, a first inductor, and a first capacitor. The first and second switch nodes are connected to opposite terminals of the first inductor. The AC node and the second DC terminal are connected to opposite terminals of the first capacitor, such that the second DC terminal forms a common node of the first capacitors of the plurality of converter modules. A connection between the AC nodes of the plurality of converter modules and the plurality of AC terminals is reconfigurable allowing the electrical converter to operate according to a first mode of operation and according to a second mode of operation. The first mode of operation is configured to convert between a first AC signal having a first plurality $p_1 \geq 2$ of phase voltages and the DC signal. The second mode of operation is configured to convert between a second AC signal having a single-phase voltage or a second plurality $p_2$ of phase voltages and the DC signal, such that the plurality of converter modules contributing to converting between the first AC signal and the DC signal in the first mode of operation contribute to conversion between the second AC signal and the DC signal or to an active capacitive energy storage in the second mode of operation.

Electrical converters according to the present disclosure feature a modular structure comprising a plurality of converter modules which are configured to operate in parallel groups between the AC terminals and the DC terminals. The AC grid currents are shared amongst the converter modules allowing each converter module to be controlled individually, in a modular fashion. One advantage of electrical converters of the present disclosure is that the converter can be reconfigured by rearranging the groups of parallel converter modules when switching between three-phase and single-phase operation, without loss of modularity. This modular approach further allows to reduce switching losses and eliminate the need of component overdimensioning.

According to a further aspect of the present disclosure, there is provided an electric battery charging system, as set out in the appended claims.

According to a further aspect of the present disclosure, a method for converting between an AC signal and a DC signal is described herein. In a first mode of operation, the method comprises configuring a plurality of converter modules and convert between an AC signal having a first plurality $p_1 \geq 2$ of phase voltages, advantageously $p_1 \geq 3$ phase voltages and a DC signal. In a second mode of operation, the method comprises reconfiguring the plurality of converter modules and convert between an AC signal having a single phase voltage or a second plurality $p_2$ of phase voltages and the DC signal.

Advantageously, the plurality of converter modules are at least $p_1 k$ converter modules, k being a positive integer equal to or larger than two. In the first mode of operation, the $p_1 k$ converter modules are grouped in $p_1$ first groups to convert between a first AC signal having a first plurality $p_1 \geq 2$ of phase voltages and the DC signal. In the second mode of operation, the $p_1 k$ converter modules are rearranged in at least two second groups. Converter modules assigned to a same group of the first groups and the second groups are operated in parallel.

BRIEF DESCRIPTION OF THE DRAWINGS

Aspects of the present disclosure will now be described in more detail with reference to the appended drawings, wherein same reference numerals illustrate same features.

FIG. 5A represents the AC and DC terminal voltages. FIG. 5B represents the duty cycles of the buck stage (A) and the boost stage (B) of a single converter module of FIG. 3. FIG. 5C represents the phase terminal and converter module currents when two paralleled converter modules equally share the phase current. FIG. 5D represents the system instantaneous and average power.

FIG. 6A represents the AC and DC terminal voltages. FIG. 6B represents the duty cycles of the buck stage (A) and the boost stage (B) of a single converter module of FIG. 3 connected to the line terminal g. FIG. 6C represents the phase terminal and currents of a converter module connected to line terminal g when three paralleled converter modules equally share the line current. FIG. 6D represents the system instantaneous and average power.

FIG. 11A represents the electrical converter of FIG. 1 in which the AC-sided terminal of the input capacitors of the converter modules within each group are interconnected in three-phase operation. FIG. 11B represents the electrical converter of FIG. 2 in which the AC-sided terminal of the input capacitors of the converter modules within each group are interconnected in single-phase operation.

FIG. 15A represents another electrical converter as described herein connected to a three-phase grid, wherein one converter module is capable of acting as a power pulsation buffer. FIG. 15 B represents the electrical converter of FIG. 15A connected to a single-phase grid, with two converter modules connected to respective phase terminals and a third converter module disconnected from the grid and acting as a power pulsation buffer.

DETAILED DESCRIPTION

Figure 1:
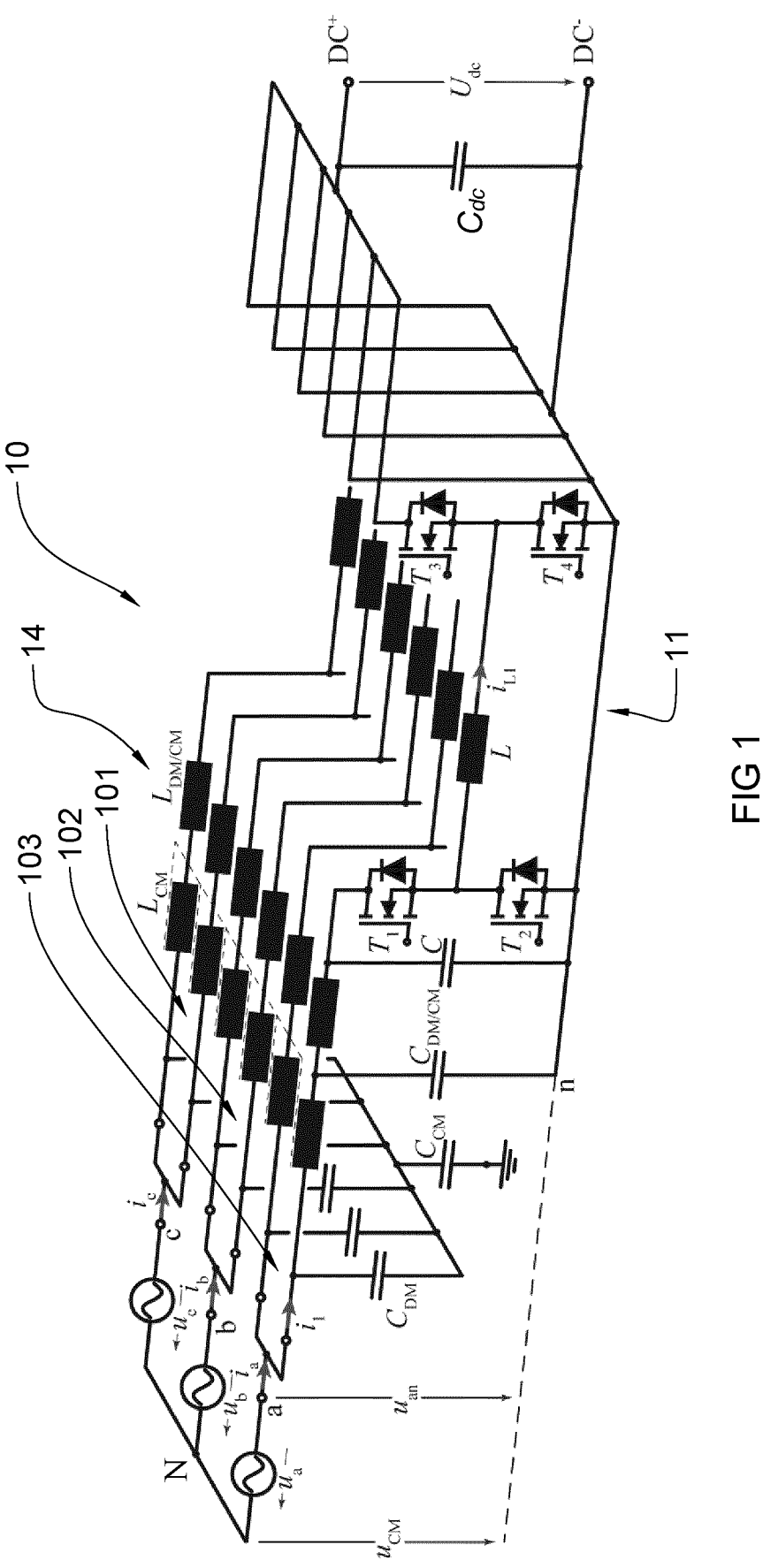
FIG. 1 represents a perspective view of a six-module Y-converter (rectifier) according to the present disclosure connected to a three-phase AC grid with three groups of two paralleled modules connected to respective three phase terminals.
Figure 2:
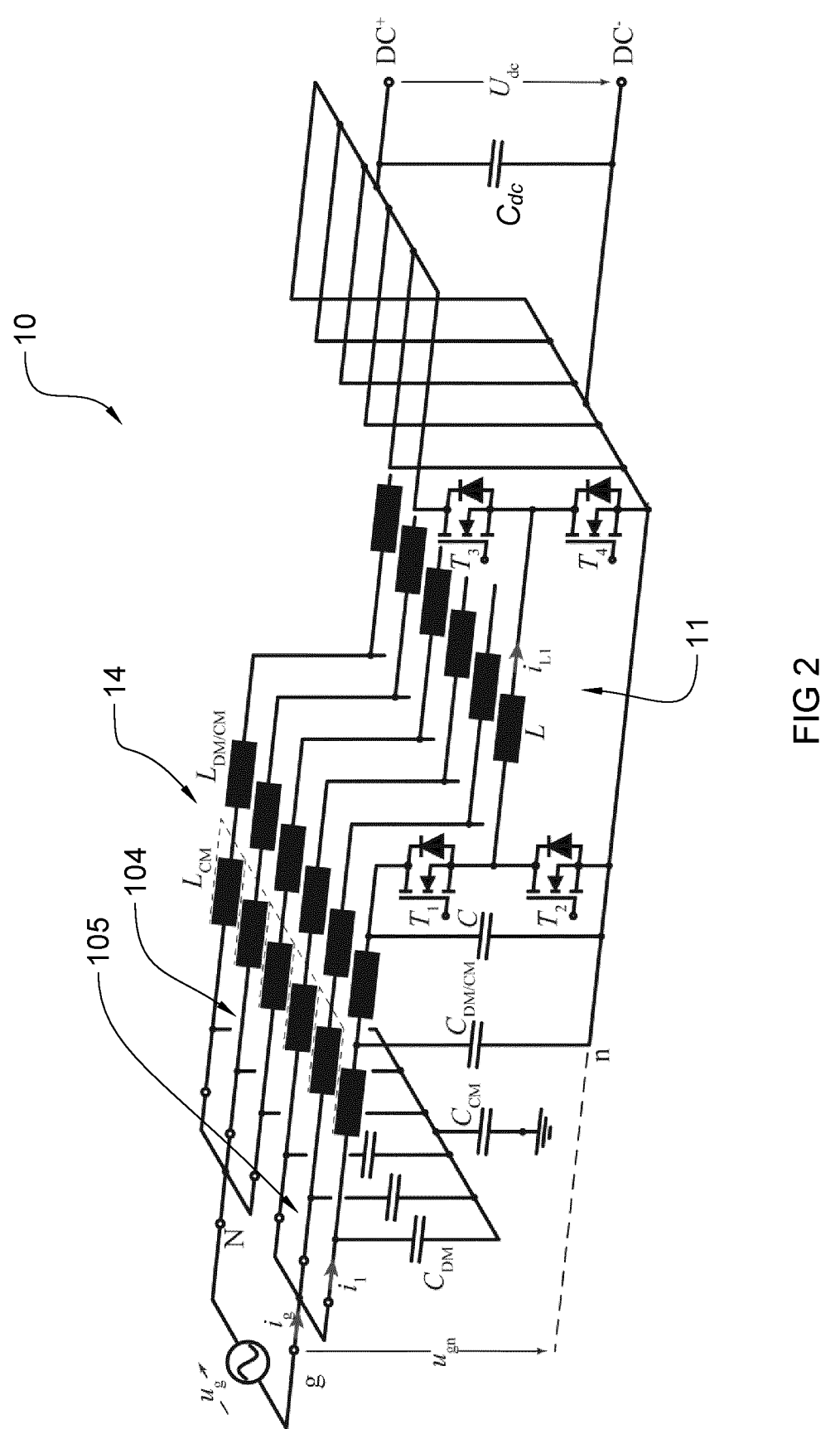
FIG. 2 represents the six-module Y-converter of FIG. 1 connected to a single-phase AC grid with two groups of three paralleled modules connected to the line and neutral conductors.

Referring to FIGS. 1 and 2, an electrical converter 10 according to aspects of the present disclosure comprises a plurality of possibly identical converter modules 11 arranged between an AC interface with phase terminals referenced as a, b, c in case of three-phase operation (FIG. 1) or g, N in case of single-phase operation (FIG. 2), with g representing the line and N the neutral connection terminals. The electrical converter 10 is hence capable of operating both in three-phase AC to DC conversion and in single-phase AC to DC conversion.

The electrical converter 10 as shown in FIGS. 1 and 2 comprises six converter modules 11 which are all referenced to the negative DC link rail n which in turn is connected to the negative DC terminal DC$^-$. In three-phase operation as shown in FIG. 1, two converter modules 11 are connected in parallel to each phase terminal a, b, c, hence forming three groups 101, 102, 103 of two parallel converter modules each. The neutral terminal N is advantageously not connected to any of the converter modules, nor to the negative DC terminal. The two converter modules of each group 101, 102, 103 advantageously equally share the respective phase current $i_a$, $i_b$, $i_c$, i.e. for the converter modules of group 103 connected to phase a: $i_1 = i_a/2$. In single-phase operation as depicted in FIG. 2, the electrical converter 10 is reconfigured such that three converter modules 11 are connected in parallel to each terminal g (grid line) and N (neutral), hence forming two groups 104, 105 of three parallel converter modules 11 each. The single-phase grid current $i_g$ is advantageously equally shared among them and $i_1 = i_g/3$.

More generally, it can be stated that the electrical converter comprises $p_1 \times k$ modules, advantageously $p_1 \times p_2 \times k$ modules, with $p_1$, $p_2$ and k being positive integers ($\in \mathbb{N}_1$, advantageously $p_1 > p_2$, and the electrical converter is reconfigurable between a first state of operation for converting between a first AC signal having $p_1$ phase voltages and a DC signal and between a second state of operation for converting between a second AC signal having $p_2$ phase voltages and the DC signal. In the example of FIGS. 1 and 2, k=1, $p_1$=3 and $p_2$=2. The reconfiguration between these two states of operation is effected by arranging the converter modules in $p_1$ groups of $p_2$k parallel operated converter modules in the first state of operation and in $p_2$ groups of $p_1$k parallel operated converter modules in the second state of operation. The presence of $p_1 \times p_2 \times k$ modules states a degree of freedom for the converter configuration, such that the converter modules are regrouped depending on whether $p_1$- or $p_2$-phase operation is performed, allowing in both cases utilization of all modules for power conversion. Reconfiguration can be effected manually or automatically, such as through mechanical contact switches or relays.

The converter modules of all groups (both in single-phase and three-phase operation) are parallel connected to the DC link capacitor $C_{dc}$ which has terminals connected to the positive DC terminal $DC^+$ and to the negative DC terminal $DC^-$ respectively.

A suitable filter structure 14 can be provided at the AC side of the electrical converter in order to comply with electromagnetic interference (EMI) emission standards in both three-phase and single-phase operation. Filter structure 14 advantageously comprises a common mode (CM) filter. The common mode filter can comprise or consist of a common mode choke $L_{CM}$ advantageously having a number of windings equal to the number of converter modules, e.g. for the six-converter module electrical converter 10, $L_{CM}$ is a six-winding choke. In addition, or alternatively, a differential mode filter can be provided as known in the art. Hence the filter structure 14 can comprise one or more of: common mode capacitors $C_{CM}$, differential mode capacitors $C_{DM}$, differential mode inductors $L_{DM}$ and common mode inductors $L_{CM}$.

Figure 3:
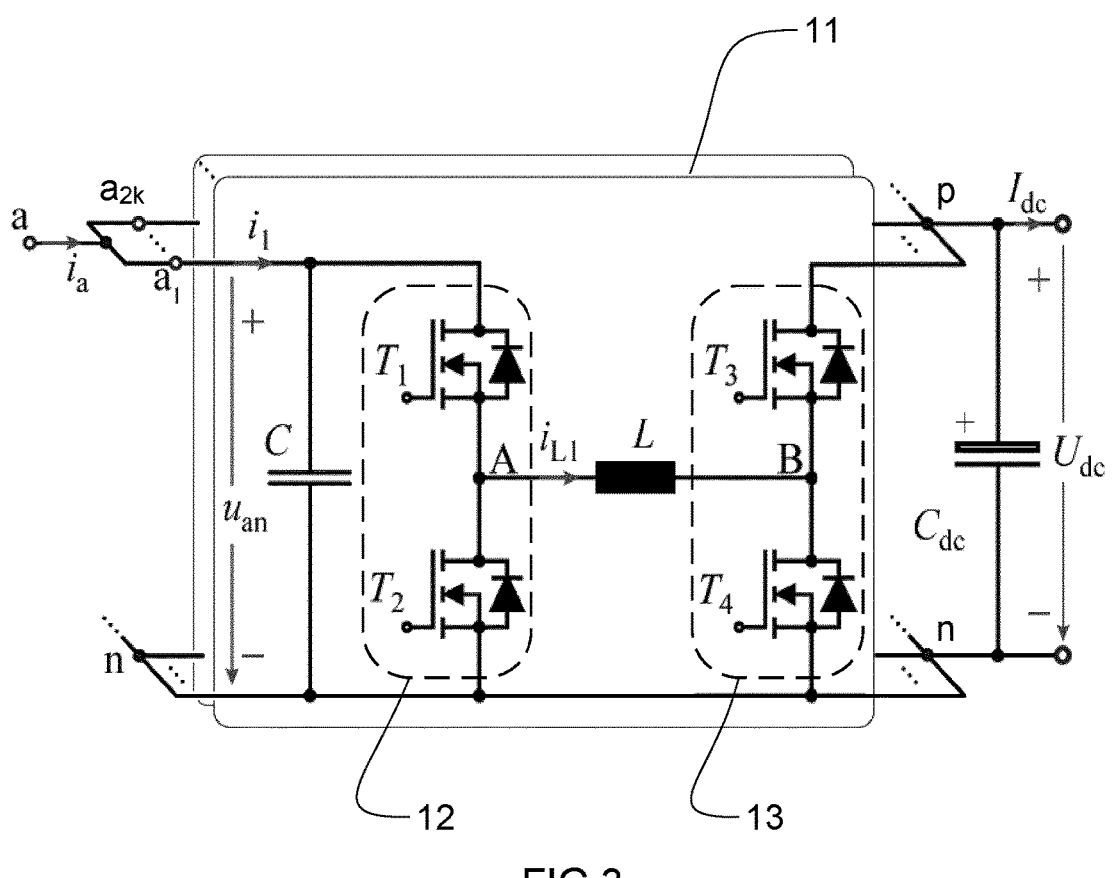
FIG. 3 represents a converter module used as building block for the converter of FIG. 1 and FIG. 2.

One such converter module 11 is represented in isolated view in FIG. 3. Converter module 11 comprises two stages 12 and 13. The first stage 12 is connected across the AC-side capacitor C and comprises a switch node A. The AC-side capacitor C is connected between the AC node $a_1$ and the negative DC link rail n. The first stage 12 comprises a suitable conversion circuitry, such as a half-bridge with active switches $T_1$ and $T_2$ respectively connecting opposite terminals of capacitor C (i.e., the AC node $a_1$ and the negative DC-link rail n) to the switch node A. In FIG. 3, the respective branch of filter structure 14 (FIG. 1) of electrical converter 10 is omitted. However, it will be evident that any suitable filter branch may be connected between phase terminal a and the AC node $a_1$ of the converter module.

The second stage 13 is connected between the positive DC link node p and the negative DC link rail n, and comprises a switch node B. The second stage 13 comprises a suitable conversion circuitry, such as a half-bridge with active switches $T_3$ and $T_4$ respectively connecting the positive DC link rail (node p) and the negative DC link rail n to the switch node B.

Switch nodes A and B are connected to opposite terminals of a physical inductor L.

The above topology allows each converter module 11 to independently perform buck-boost AC/DC conversion between an AC signal at node $a_1$ and a DC signal between nodes p and n. As will be explained in detail below, the first stage 12 is operated when buck converter operation is required, whereas the second stage 13 is operated when boost converter operation is required. The buck and boost stages are advantageously operated in a mutually exclusive fashion, meaning that only one of the two stages 12, 13 are pulse width modulated at a point of time, while the other stage has its switch node A, B clamped to the respective AC node $a_1$, and the positive DC link node p, respectively. By so doing, single-stage high-frequency energy conversion can be obtained, leading to improved performance.

It will be convenient to note that the half bridges of the first stage 12 and/or the second stage 13 can be replaced with any other suitable conversion circuitry allowing to obtain single stage buck or boost AC/DC conversion. One example of a suitable conversion circuitry is a (multi-level) flying capacitor circuit such as described in Dutch patent application No. 2026176 filed on 30 Jul. 2020, the contents of which are incorporated herein by reference.

Referring to FIG. 3, in order to achieve single-stage high-frequency energy conversion, the converter module 11 is working depending on the instantaneous modulation depth $m(t)=u_{an}(t)/U_{dc}$ (i.e. the input-output voltage ratio) in one of the two possible operation modes: boost operation, and buck operation.

Boost operation mode (of converter module 11 linked to AC terminal a) is selected when the respective phase input voltage $u_{an}$ is lower than $U_{dc}$. The upper switch $T_1$ of the buck bridge-leg (stage 12) is permanently turned on and hence the switch node A of stage 12 is clamped to the AC terminal voltage. The boost stage 13 is controlled through pulse width modulation (PWM) such that the voltage of switch node B has a local average value (i.e. averaged over one pulse period) equal to the AC terminal voltage. In this mode of operation, a second order input filter is advantageously formed by the phase inductor L and the AC-side capacitor C.

Buck operation mode is selected when $u_{an}$ exceeds $U_d$c. The upper switch $T_3$ of the boost bridge-leg (stage 13) is permanently turned on and the switch node B of the boost stage 13 is clamped to the positive DC link rail (node p). Stage 12 is now PWM operated in order to step down the AC terminal voltage, such that the voltage of switch node A has a local average value equal to the DC voltage $U_{dc}$. In this operation mode, solely the AC-side capacitor C is acting as an input filter and the inductor current $i_{L1}$ shows an elevated fundamental (local average) current $(i_{L1}) \geq i_1$.

The active switches $T_1$, $T_2$ of the buck stage 12 and $T_3$, $T_4$ of the boost stage 13 are advantageously semiconductor switching devices, e.g. Field Effect Transistors (FETs), in particular MOSFET devices.

Accordingly, the stages 12, 13 of converter module 11 are operated with time varying duty cycles $d_A$ of the buck stage 12 and $d_B$ of the boost stage 13 which can be defined by:

$$d_A(t) = \min\left(1, \frac{1}{m(t)}\right)$$

$$d_B(t) = \min(1, m(t)).$$

Figure 4:
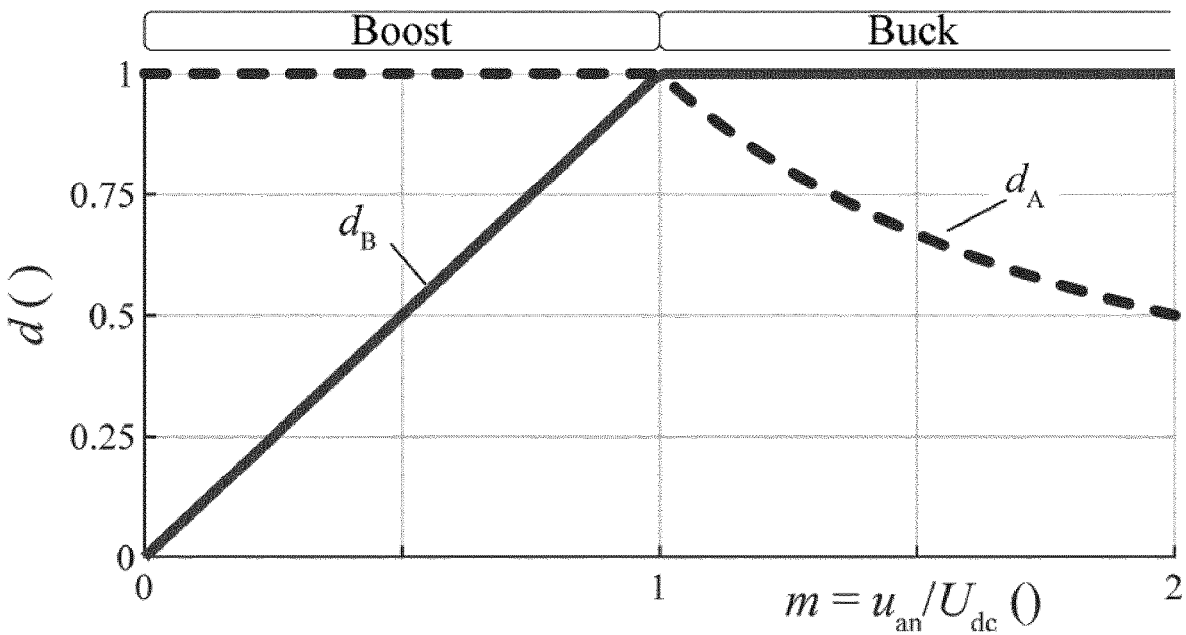
FIG. 4 represents the resulting duty cycles of the buck and the boost stage of the converter module of FIG. 3 depending on the instantaneous input-output voltage ratio.
Figure 5A:
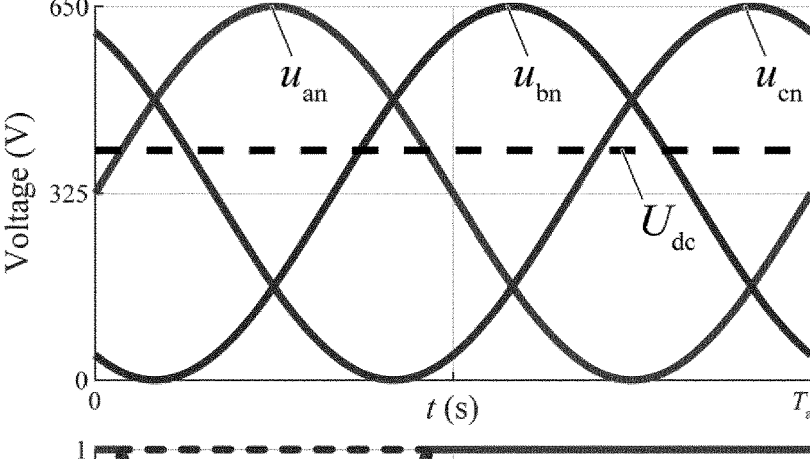
FIGS. 5A-D represent the main waveforms of the electrical converter of FIG. 1 in three-phase operation for an average system output power $\overline{P}$=6.6 kW and a DC voltage of 400 V.
Figure 5B:
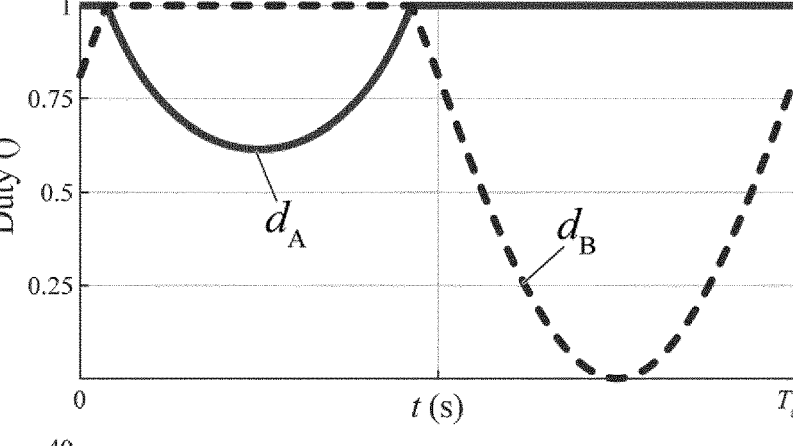
Figure 5C:
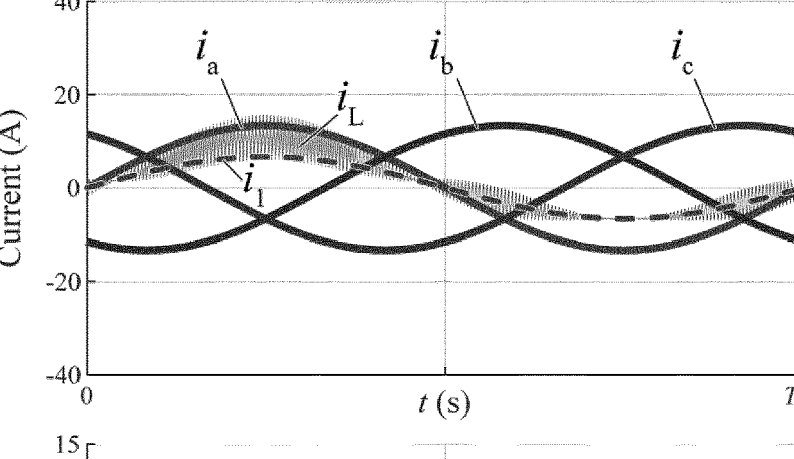
Figure 5D:
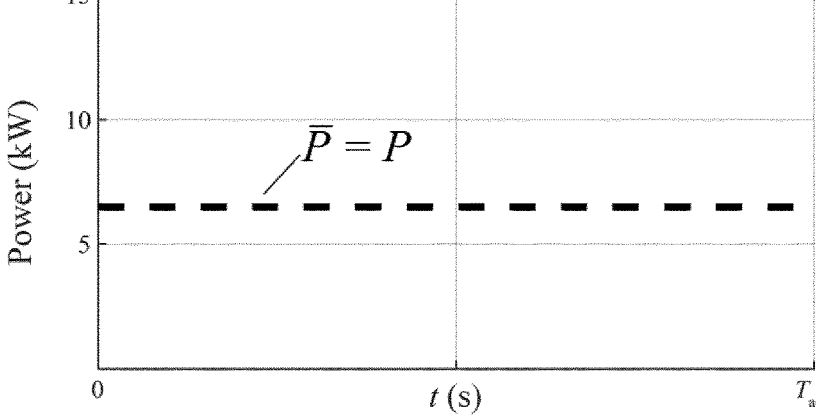

The duty cycles are graphically represented in FIG. 4. These duty cycles ensure the mutually exclusive high-frequency operation of buck and boost stages 12, 13 respectively. Also, as can be seen from FIG. 4, both duty cycles $d_A$ and $d_B$ are advantageously continuous, allowing a simple control structure, avoiding transient oscillations during the changeover of the modulation regions.

Referring again to FIG. 1, in three-phase operation, the electrical converter 10 is configured such that the six converter modules 11 are grouped in three groups 101-103 of each two converter modules operating in parallel and connected to a respective one of the three phase terminals a, b, c. The two converter modules 11 of each group 101-103 are identical and hence equally share the respective phase current, e.g. for phase a: $i_1=i_a/2$. In rectifier operation, the converter modules are operated independently as indicated above with half the phase current. A constant instantaneous power P, equal to the desired average output power $\overline{P}$, is drawn from the grid. Advantageously, the two paralleled converter modules are provided with 360°/2k=1800 phase-shifted PWM carriers to enable interleaved operation of the active switches of the stages 12 and 13 and reduced high-frequency EMI emissions.

Referring to FIGS. 5A-D, the voltages between the AC terminals and the negative DC link rail n, i.e. the voltages across the capacitor C, denoted $u_{an}$, (and for the two other phases b, c: $u_{bn}$, and $u_{cn}$) are strictly positive allowing the converter modules to be operated as DC/DC converters. Since the common-mode offset $u_{CM}=\frac{1}{3} (u_{an}+u_{bn}+u_{cn})$ has no corresponding current path, sinusoidal grid currents $i_a$, $i_b$, $i_c$ can be regulated. $u_{CM}$ is only constrained by the requirement of strictly positive terminal voltages and can be used to enable e.g. Discontinuous Pulse Width Modulation (DPWM), advantageously allowing for reducing the number of switching actions by 33% and featuring hence a substantial decrease in semiconductor switching losses. The main converter waveforms are shown in FIGS. 5A-D for an average system output power $\overline{P}$=6.6 kW and a DC voltage of 400 V.

Referring again to FIG. 2, in single-phase operation, the electrical converter 10 is configured such that the six converter modules 11 are grouped in two groups 104, 105 of three parallel converter modules. The converter modules of group 105 are connected to the line g and those of group 104 to the neutral terminal N of the grid.

Referring to FIGS. 6A-D, the voltages between the AC terminals g, N and the negative DC link rail n, i.e. the voltages across the capacitor C, denoted $u_{gn}$ and $u_{Nn}$ are strictly positive, allowing the converter modules to be operated as DC/DC converters. The input current of the converter modules connected to line g is given by $i_1=i_g/3$. Advantageously, each group 104, 105 of converter modules is clamped, i.e. $T_1$ and $T_4$ are permanently on, during one half of the grid fundamental period $T_{ac}$ in which the respective phase has the lowest voltage, allowing for reducing the number of switching actions by 50%. The other group of 104, 105 having the highest phase voltage during the half of the grid fundamental period is operated normally as described above (i.e. boost or buck operation with PWM). The main converter waveforms are shown in FIGS. 6A-D for an average system output power $\overline{P}$=6.6 kW and a DC voltage of 400 V. As $u_{gn}$ and $u_{Nn}$ are permanently below the DC link voltage $U_{dc}$=400 V, all converter modules are operated in boost mode when active, as can be observed in the duty cycle waveforms displayed in FIG. 6B. Also in this mode of operation, the paralleled converter modules can advantageously be supplied with 360°/3k=1200 phase-shifted PWM carriers to enable interleaved operation of the boost stages and allowing reduced high-frequency EMI emissions.

Figures 7, 8:
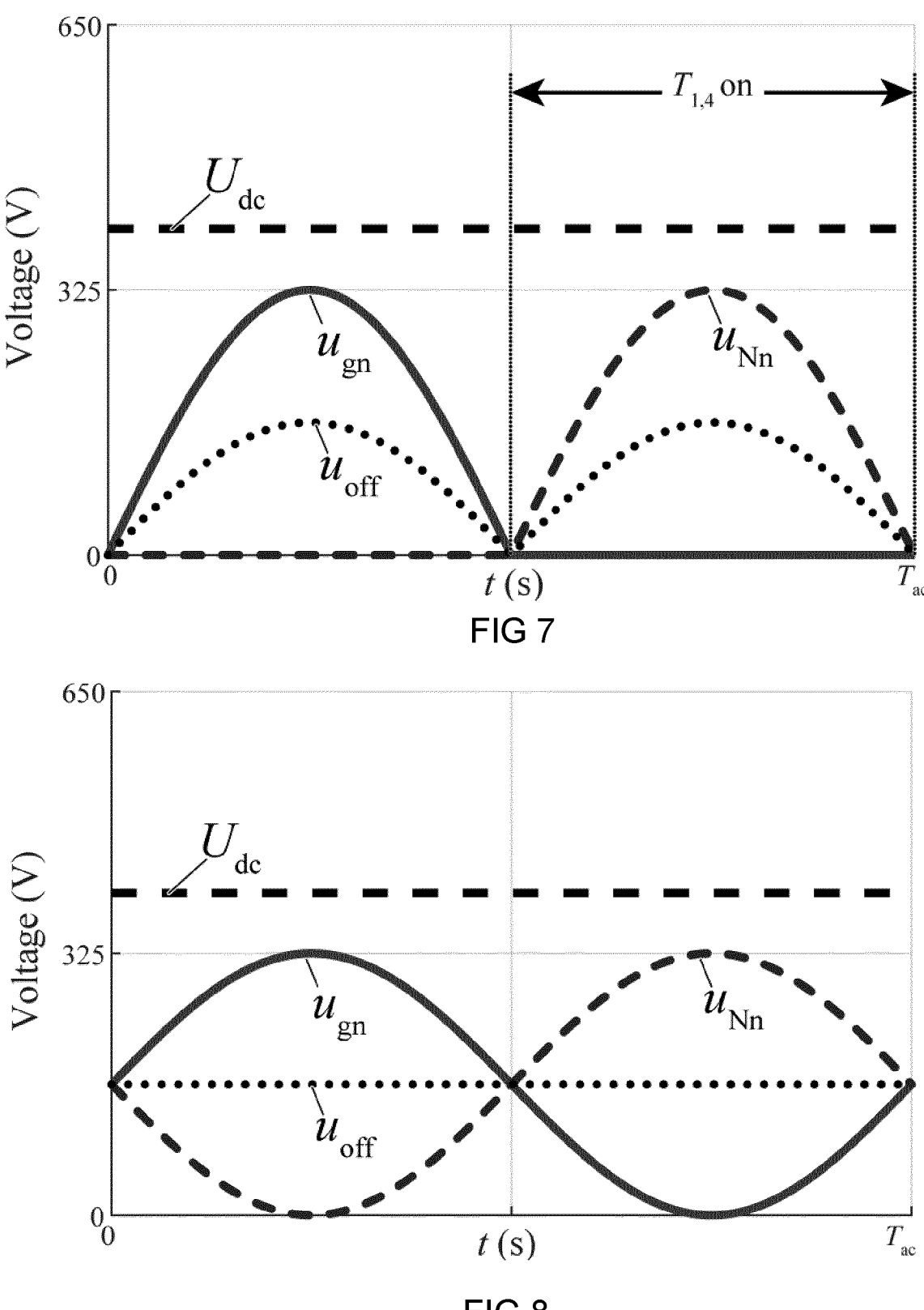
FIG. 7 represents the AC and DC terminal voltage waveforms of the electrical converter of FIG. 2 in single-phase operation with DC voltage of 400 V and with a time-varying offset voltage for the AC-side terminal voltages.
FIG. 8 represents the AC and DC terminal voltage waveforms of the electrical converter of FIG. 2 in single-phase operation with DC voltage of 400 V and with a minimum constant offset voltage for the AC-side terminal voltages.

In single-phase operation, a terminal voltage offset $u_{off}=(u_{gn}+u_{Nn})/2$ with respect to the negative DC link rail n cancels out and states a degree of freedom for the single-phase operation allowing to redistribute conduction and switching stresses among the power semiconductors of the converter modules. FIG. 7 shows a first possible terminal voltage waveform. Here the terminal voltage offset $u_{off}$ is time varying allowing each group 104 and 105 of converter modules to be PWM operated only during 50% of the fundamental period $T_{ac}$. FIG. 8 shows a second possible terminal voltage waveform with a constant terminal voltage offset. In the latter case, both groups 104 and 105 of converter modules need to be PWM operated continuously.

Figure 9:
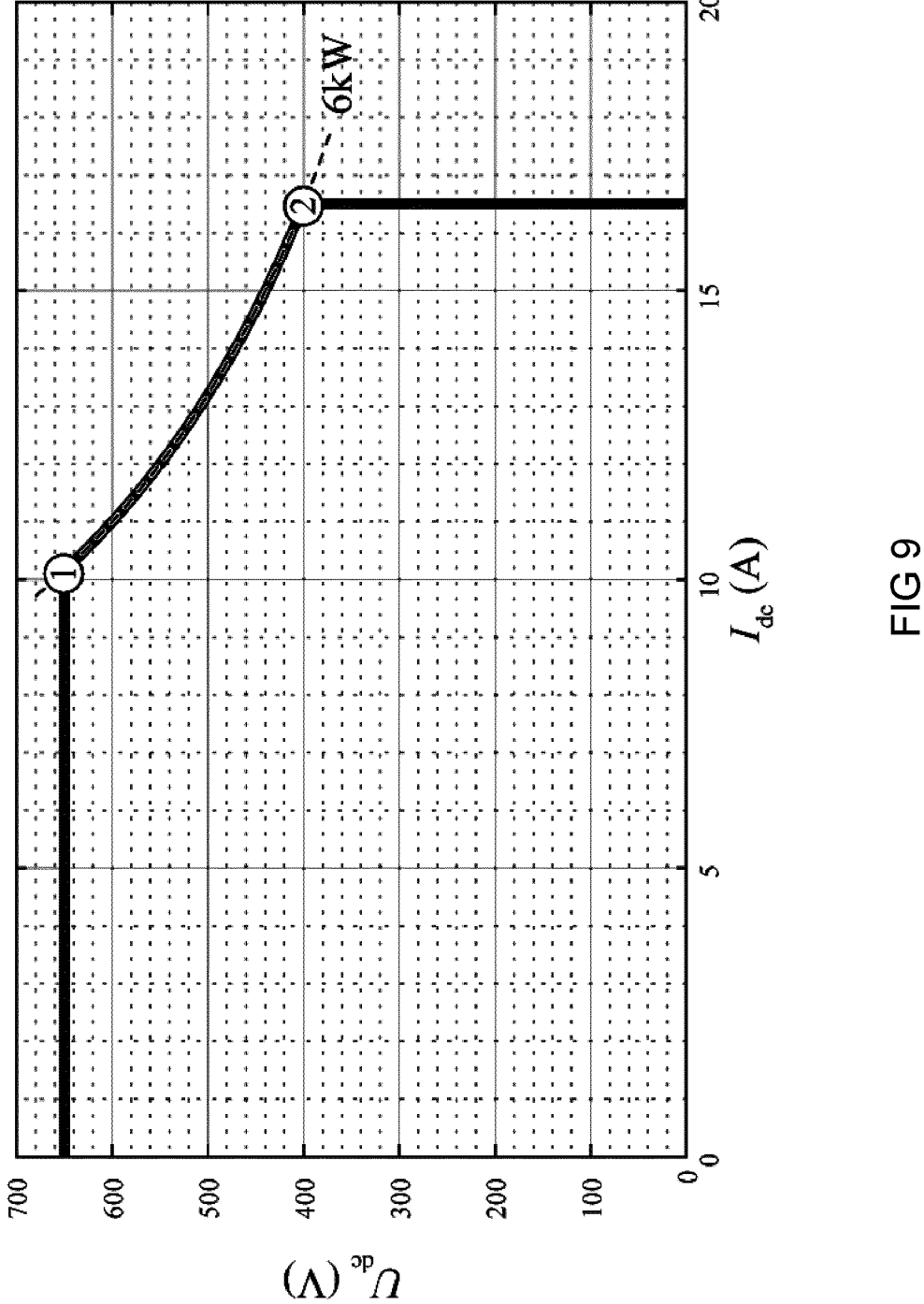
FIG. 9 represents DC output voltage and current range for a constant system power of 6.6 kW within a wide DC voltage range of 400 V-650 V.

A current stress analysis was performed for the electrical converter as shown in FIG. 1 and FIG. 2, both for three-phase and for single-phase operation. To this end, two operating points ① and ② were selected as indicated in FIG. 9. Operating point ① refers to a DC voltage of 400 V and output power $\overline{P}$=6.6 kW. Operating point ② refers to a DC voltage of 650 V and output power $\overline{P}$=6.6 kW. The resulting component RMS and peak current stresses of one converter module in three-phase and single-phase operation for the two operating points ① and ② are shown in Table 1. It will be convenient to note that the line current (i.e. $i_g$ or $i_a$) is elevated by a factor of three in single-phase operation (compared to three-phase operation), but as it is shared among 3k paralleled converter modules, the line current has no direct influence on the component stresses and hence on the component dimensioning.

From Table 1 it can be derived that the converter module input current $i_1$ represents the predominant loss driver in the inductive components of the EMI filter (i.e. $L_{CM}$, $L_{DM/CM}$ in FIGS. 1 and 2) and is elevated by a factor of two in single-phase operation. Hence, a filter component overdimensioning would be advantageous.

For the inductor current $i_L$ and semiconductor currents $i_{T1}$, $i_{T2}$, $i_{T3}$ the stress increase for single-phase operation is less pronounced, as also the high-frequency current ripple impacts the resulting current RMS and peak values. Only semiconductor switch $T_4$ faces a substantial current stress increase up to a factor of 2.5 given by the constant boost operation, as well as the clamping according to FIG. 6A. At the same time the clamping reduces the number of switching actions and hence the switching losses in $T_4$.

Table 1: module component RMS and peak current stresses for the two operating points ① and ② highlighted in FIG. 9 (i.e. with a DC output voltage of 400 V and 650 V) in three-phase and single-phase configuration for a grid line-to-neutral voltage of 325 $V_{pk}$. The component designators refer to FIGS. 1 and 2, where $i_a$ and $i_g$ correspond to the line current, in three-phase and single-phase operation, respectively and $i_{T1}$, $i_{T2}$, $i_{T3}$, $i_{T4}$ are the currents through the semiconductor switches $T_1$, $T_2$, $T_3$, $T_4$, respectively. The line current is split equally among the parallel modules within a group, where the maximally occurring stresses of each component within the considered operating points are highlighted in bold and compared for three-phase (2 paralleled converter modules) and single-phase (three paralleled converter modules) operation, respectively.

| | Three-Phase | | | | Single-Phase | | | | 1phase/3phase | |
| | 400 $V_{DC}$ | | 650 $V_{DC}$ | | 400 $V_{DC}$ | | 650 $V_{DC}$ | | Max. Stress | |
| | $A_{rms}$ | $A_{pk}$ | $A_{rms}$ | $A_{pk}$ | $A_{rms}$ | $A_{pk}$ | $A_{rms}$ | $A_{pk}$ | $A_{rms}/A_{rms}$ | $A_{pk}/A_{pk}$ |
|---|---|---|---|---|---|---|---|---|---|---|
| $i_a$ ($i_g$) | 9.4 | 13.3 | 9.4 | 13.3 | 28.3 | 40 | 28.3 | 40 | 3.0 | 3.0 |
| $i_1$ | 4.7 | 6.7 | 4.7 | 6.7 | 9.4 | 13.3 | 9.4 | 13.3 | 2.0 | 2.0 |
| $i_L$ | 6.3 | 15.6 | 5 | 7.3 | 9.5 | 15.2 | 9.6 | 18.4 | 1.5 | 1.2 |
| $i_{T1}$ | 5.5 | 15.6 | 5 | 7.3 | 9.5 | 15.2 | 9.6 | 18.4 | 1.7 | 1.2 |
| $i_{T2}$ | 3 | 15.6 | 0 | 0 | 0 | 0 | 0 | 0 | 0.0 | 0.0 |
| $i_{T3}$ | 5.4 | 15.6 | 3.6 | 7.3 | 5.6 | 15.2 | 4.5 | 18.4 | 1.0 | 1.2 |
| $i_{T4}$ | 3.2 | 7.1 | 3.6 | 7.3 | 7.7 | 15.2 | 8.5 | 18.4 | 2.4 | 2.5 |

Figures 6A, 6B, 6C, 6D:
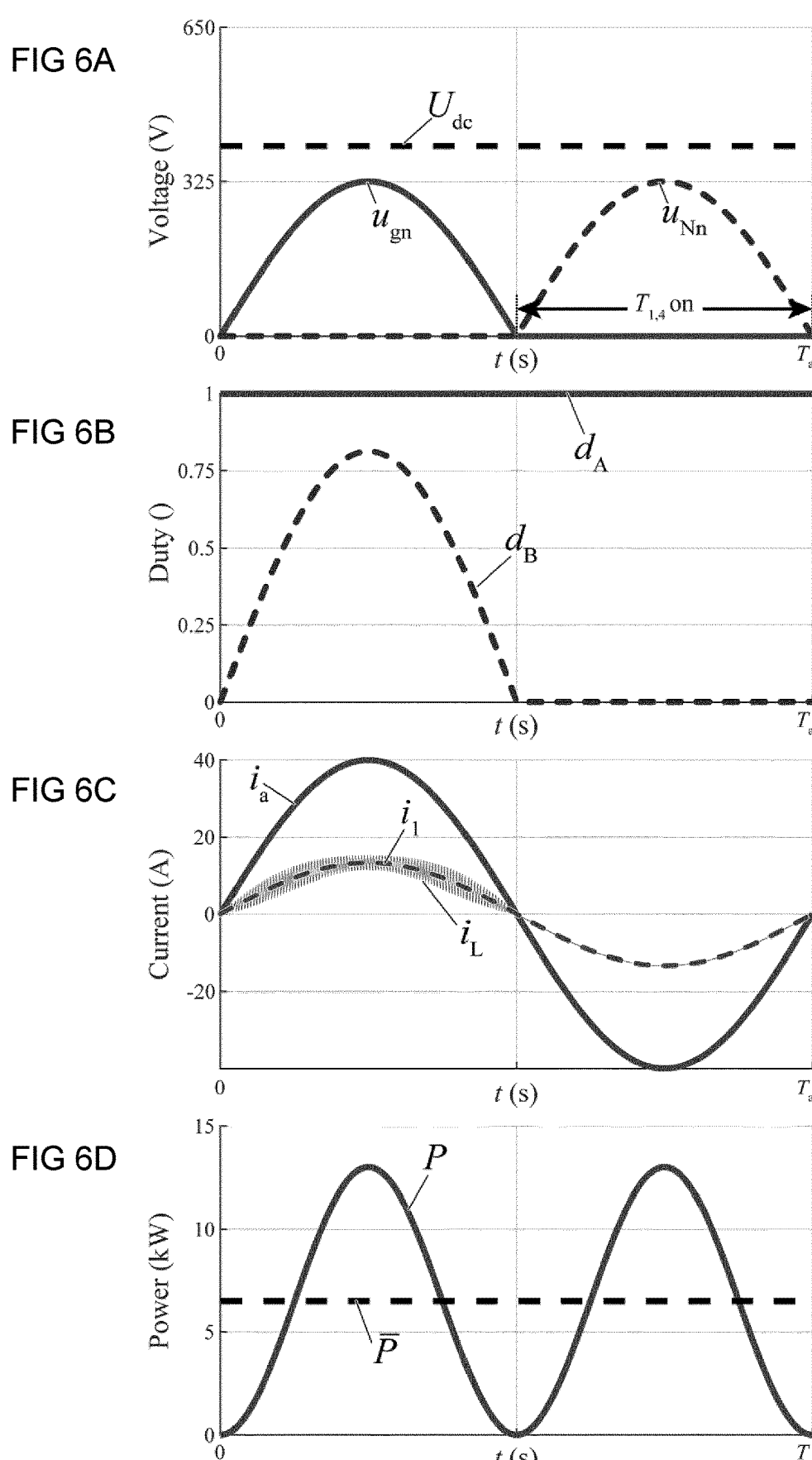
FIGS. 6A-D represent the main waveforms of the electrical converter of FIG. 2 in single-phase operation for an average system output power $\overline{P}$=6.6 kW and a DC voltage of 400 V.

The current stresses of $T_4$ can be reduced by selecting a higher offset voltage $u_{off}$ and/or by advantageously turning on $T_2$ (with low current stresses in single-phase operation) during the clamping interval of $T_1$ and $T_4$ indicated in FIG. 6A, allowing current sharing between $T_2$ and $T_4$ and reduced overall conduction losses.

Figure 10:
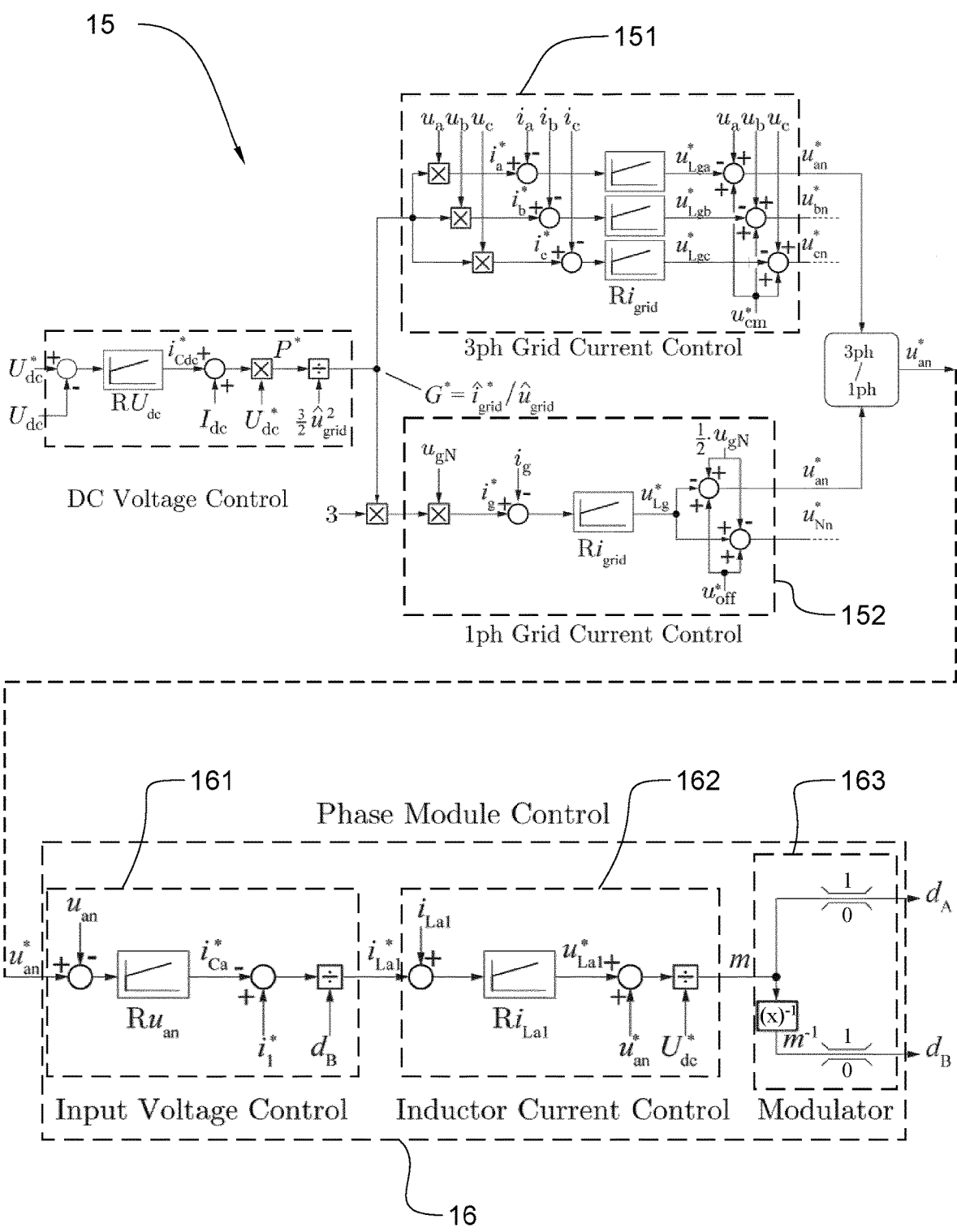
FIG. 10 represents an exemplary embodiment of a control unit for operating the electrical converter of FIGS. 1 and 2, both in three-phase and in single-phase operation. The control unit implements a cascaded control structure, and possible measurements are indicated.

Referring to FIG. 10, the converter 10 comprises a control unit 15 configured to operate the electrical converter, both in three-phase operation and in single-phase operation. The control unit 15 can comprise individual control modules for operating the different converter modules 11 in a modular/ independent fashion. One such individual control module 16 for operating a single converter module 11, e.g. one of the converter modules of group 103 linked to AC terminal a, is shown schematically in FIG. 10.

The control unit 15 is advantageously configured to perform power factor correction (PFC) rectifier control with a cascaded control structure as known in the art. Measurement means are advantageously provided for measuring the three-phase AC grid voltages $u_a$, $u_b$, $u_c$, single-phase AC grid voltage $u_{gN}$ and three-phase grid currents $i_a$, $i_b$, $i_c$, single-phase grid current $i_g$ and the inductor current $i_L$. On the DC side, measurement means are advantageously provided for measuring the DC terminal voltage $U_{dc}$ and advantageously the DC terminal current $I_{dc}$. These measurements are advantageously input to control unit 15.

In three-phase operation, current control is performed through three-phase current control block 151. Sinusoidal grid current references $i^*_a$, $i^*_b$, $i^*_c$ are derived based on the DC voltage error and the measured AC voltages $u_a$, $u_b$, $u_c$. Then, the AC terminal voltage references $u^*_{an}$, $u^*_{bn}$, $u^*_{cn}$ are set in order to enforce the required grid currents. These AC terminal voltage references are fed to the respective control modules 16 for operating each converter module individually.

For single-phase operation, current control is performed through single-phase current control block 152. The grid input power P is fluctuating with twice the mains frequency, and accordingly the measured DC voltage is advantageously processed with a notch filter (not shown) before comparing to its reference value. A grid current reference $i^*_g$ elevated by a factor of 3 (compared to three-phase operation) and again in phase with the measured grid voltage $u_{gN}$ is set in order to provide the desired average output power. Subsequently, based on the grid current error, the measured grid voltage $u_{gN}$ and possibly the offset voltage reference $u^*_{off}$, the input terminal voltage references $u^*_{an}$, $u^*_{Nn}$ are derived. As stated earlier, the offset voltage reference can be set to a constant value, or a time varying value, e.g. such that the lower terminal voltage reference is equal to zero.

The underlying control of the converter modules, through control modules 16 (of which only one is shown in FIG. 10), operates independently of the selected single- or three-phase configuration, where the line current reference is advantageously shared equally among the paralleled modules for each phase, i.e. $i^*_1 = i^*_a/2$ for three-phase and $i^*_1 = i^*_g/2$ for single-phase.

The control module 16 comprises an AC voltage control block 161, an inductor current control block 162, and a modulator 163. The output signal of the inductor current control block 162 is fed into the modulator 163, generating duty cycles for the mutually exclusive operation of buck stage 12 and boost stage 13. The control signals for the active switches $T_1$, $T_2$, $T_3$ and $T_4$ are then generated using PWM from the generated duty cycles as known in the art.

Referring to FIGS. 11A-B, the electrical converter 10 can be provided with additional switching means 112 (e.g. mechanical contact switches or relays) to interconnect the AC-sided terminals 111 of the AC-side capacitors C of all converter modules within one group. The interconnection allows the interleaved currents to at least partially cancel out when interleaved PWM operation between the converter modules of one group is performed, advantageously reducing the required filter attenuation to comply with EMI regulations. The interconnections between terminals 111 can be provided either for three-phase operation (FIG. 11A), for single-phase operation (FIG. 11B), or both for three-phase and single-phase operation. The interconnections 112 are advantageously switchable allowing for possibly automatic reconfiguration when reconfiguring between three-phase and single-phase operation modes.

Figures 12A, 12B:
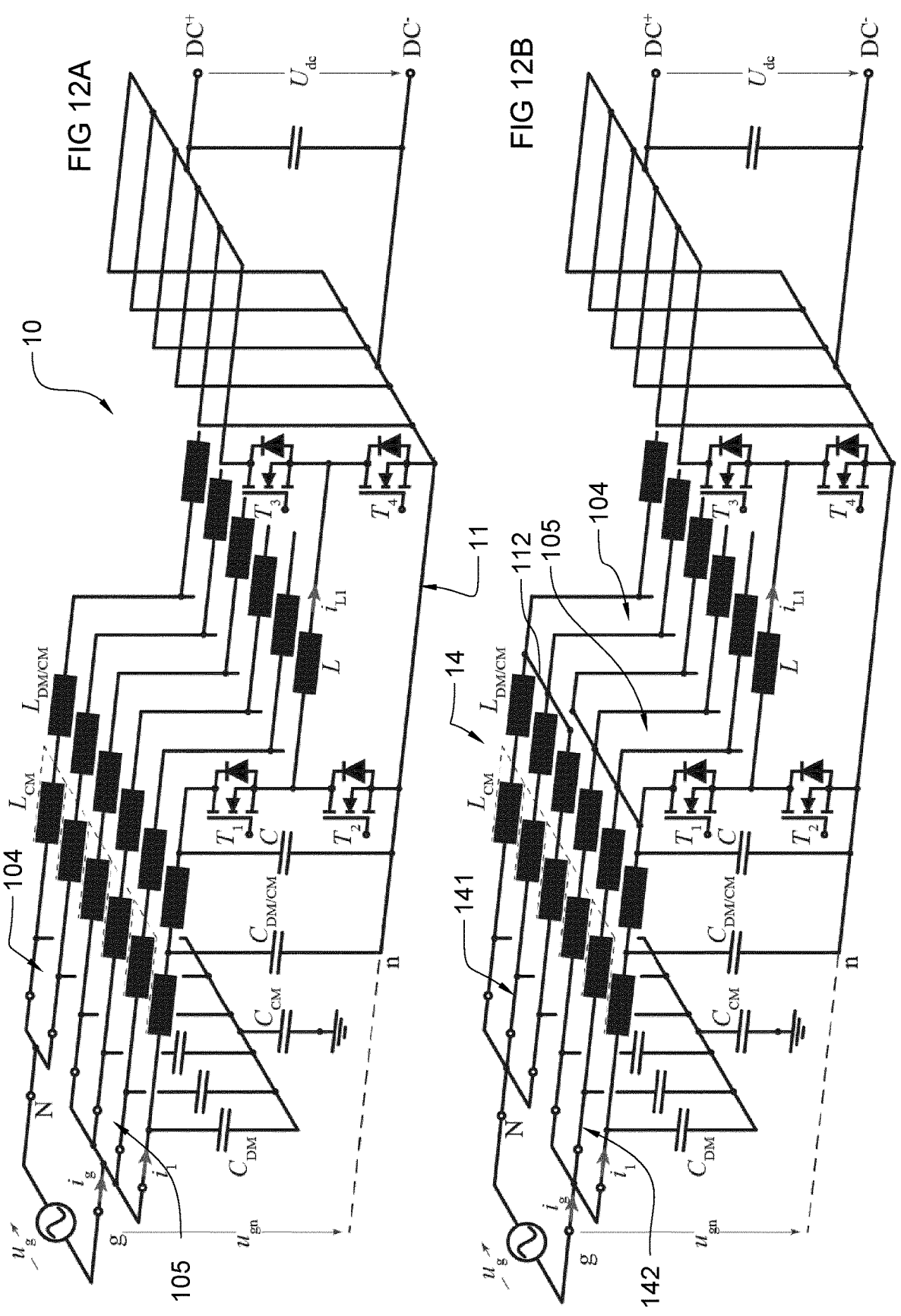
FIG. 12A represents the electrical converter of FIG. 2 in which the converter modules are grouped in groups of unequal number of converter modules in single-phase operation.
FIG. 12B represents the electrical converter of FIG. 2 in which the groups of converter modules are configured as in FIG. 12A while the AC filter structure is configured as in FIG. 2.

While in the above embodiments, all groups 101-103 and 104-105 of converter modules comprised an equal number of converter modules, this need not be so, in particular for single-phase operation. Referring to FIG. 12A, it is possible to configure the electrical converter 10 in single-phase operation such that group 105 of converter modules connected to AC line terminal g comprises four converter modules 11 arranged in parallel, whereas group 104 connected to the neutral terminal N comprises only two converter modules 11. In this case, the converter modules of group 104 would be operated as unfolder circuits, i.e. merely configured to provide a return path of the line current. With unfolder operation of the converter modules of group 104, the semiconductors $T_1$ are permanently turned on and $T_3$ and $T_2/T_4$ are alternatingly clamped to p and n, respectively at half the grid fundamental period. In unfolder operation, the converter modules of group 104 therefore would have elevated semiconductor conduction stresses, but practically no switching losses. Therefore fewer converter modules can be used for this purpose, e.g. two converter modules would be sufficient for this task, and the remaining (third) converter module can be additionally assigned to group 105 connected to the line terminal g. The converter modules of group 105 will be PWM operated as described above and therefore the semiconductor switches $T_1$-$T_4$ are high-frequency (HF)

operated hence facing both conduction and switching losses. With the added converter module, the four converter modules of group 105 equally share % of the grid current compared to ⅓ of the grid current for the configuration of FIG. 2. Thereby the current stresses on the semiconductors can be reduced while semiconductor utilization can be improved.

Figure 13:
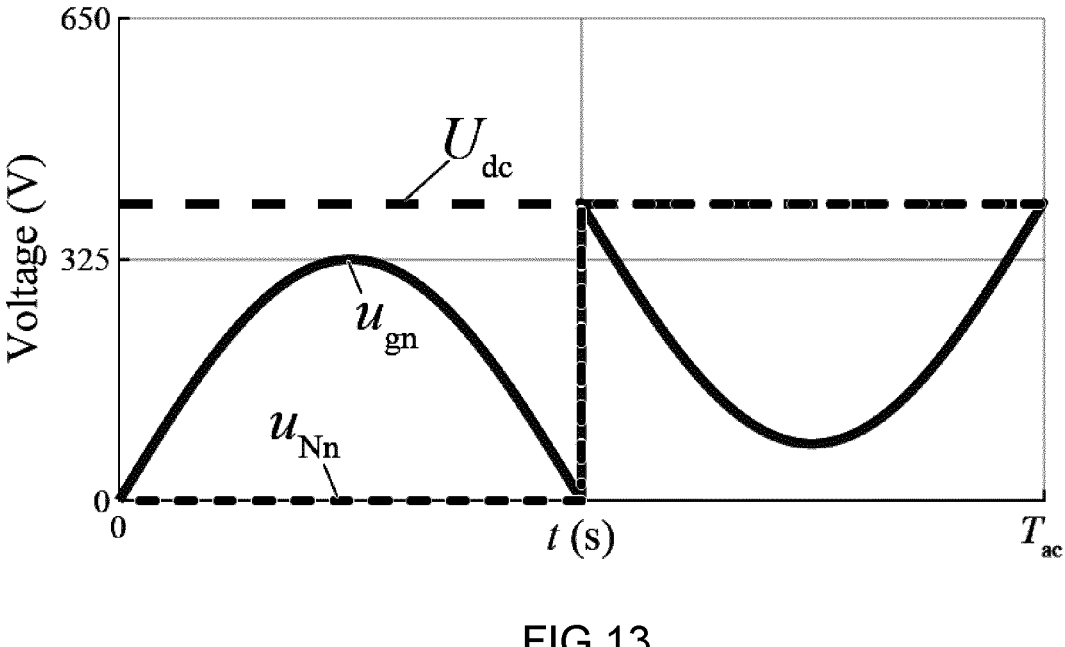
FIG. 13 represents the terminal voltage waveforms for boost operation of the electrical converter of FIG. 12A in single-phase operation.
Figure 14:
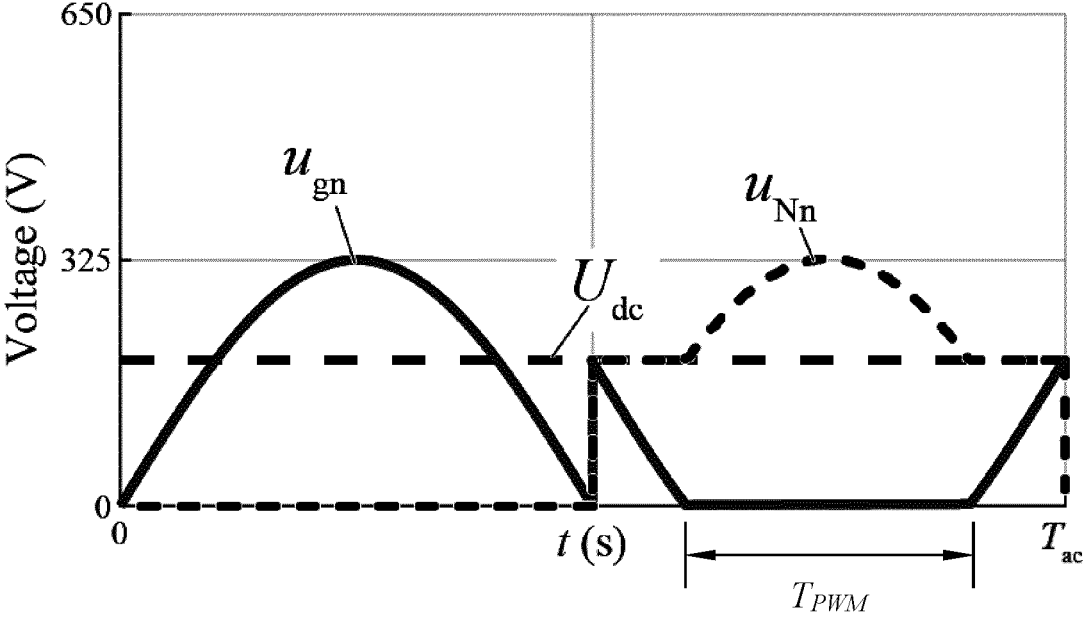
FIG. 14 represents the terminal voltage waveforms for buck and boost operation of the electrical converter of FIG. 12A in single-phase operation.

The terminal voltage waveforms for the converter configuration according to FIG. 12A in single-phase operation are shown in FIG. 13 for boost operation and FIG. 14 for buck and boost operation. Referring to FIG. 13, when the DC link voltage $U_{dc}$ is higher than $u_{gn}$, the group 104 converter modules are permanently in unfolder operation. In this case, $u_{Nn}$ is block shaped on a fundamental frequency level, while $u_{gN}$ needs to be sinusoidal. The group 105 converter modules are hence permanently in boost operation and can be individually controlled through the control module 16. It will be convenient to note that the voltage offset $u_{off}=0.5(u_{gn}+u_{Nn})$ is time varying.

The terminal voltage waveforms in buck operation (e.g. for extremely low DC voltages, where typically only reduced power has to be provided at the output) are shown in FIG. 14. In buck operation, the group 104 converter modules, i.e. assigned to terminal N, are operated as unfolder circuits except for a short period $T_{PWM}$ when $u_{Nn}$ exceeds $U_{dc}$. During $T_{PWM}$, the group 104 converter modules are PWM operated, e.g. based on the control strategy described above in relation to FIG. 10. The group 105 converter modules are advantageously clamped, i.e. $T_1$ and $T_4$ are permanently on.

In a yet alternative embodiment, referring to FIG. 12B, the converter module configuration of FIG. 12A for single-phase operation, i.e. two converter modules arranged in group 104 connected to N and four converter modules arranged in group 105 connected to g is kept, while the AC side filter structure 14 is equally shared between the two AC terminals g and N, i.e. in a 3-3 configuration. In other words, the AC filter 14 is connected to the AC terminals such that the windings of the differential mode and/or common mode inductors $L_{DM/CM}$ and $L_{CM}$ are equally shared between the terminals g and N, just like the configuration of FIG. 11B, thereby obtaining two filter groups 141 and 142 with equal number of windings (branches), while the 4/2 converter module configuration of FIG. 12A is maintained. Hence, filter group 141 is connected between terminal N and the group 104 converter modules, and filter group 142 is connected between terminal g and the group 105 converter modules. This can be obtained by suitably switching the additional switching means 112 which interconnect the AC-sided terminals 111 of the AC-side capacitors C of converter modules within one group, as shown in FIG. 12B. Advantageously, at least one of the switching means 112 should allow to disconnect a converter module from its respective AC filter branch, as shown in FIG. 12B. This allows to evenly distribute the fundamental frequency current stresses within the AC filter 14 while retaining the advantage of the 4/2 configuration of the converter modules.

In single-phase rectifier operation, a time-varying power P pulsating at twice the line frequency is drawn from the grid as shown in FIG. 6D. The output power ripple can be reduced by providing a DC link capacitor Cao of appropriate size. Alternatively, an active power pulsation buffer (PPB) can be provided for use in single-phase operation, eliminating the need of a large DC link capacitor. The active PPB can comprise a buffer capacitor and a converter circuit, such as a half-bridge converter, interfacing between the DC link and the buffer capacitor. Advantageously, the converter circuit can be provided as being identical to the converter module 11. The buck-boost capability of the converter module used as PPB advantageously allows to vary the buffer capacitor voltage in a wide range both above and below the desired DC link voltage.

Referring to FIGS. 15A-B, one or more of the converter modules 21 of the electrical converter 20, e.g. converter module 22, can be provided with a respective buffer capacitor $C_{PPB}$ for use as PPB in single-phase operation. Converter modules 21, 22 can be identical to the converter modules 11 described hereinabove. In three-phase operation, as shown in FIG. 15A, $C_{PPB}$ is disconnected from the AC terminal a allowing converter module 22 to operate along with the other converter modules 21 in modular groups connected to the respective AC terminals a, b, c as described in relation to FIG. 1. In single-phase operation, as shown in FIG. 15 B, the converter module 22 is disconnected from the AC grid and the buffer capacitor $C_{PPB}$ is parallel connected to the filter capacitors C and/or $C_{DM/CM}$ to operate as a PPB. The voltage across $C_{PPB}$ can be both above and below the DC link voltage $U_{dc}$. Although in FIG. 15B it is shown that the common mode choke $L_{CM}$ is disconnected at node 211 from the buffer capacitors/converter module 22, this is not a requirement and the common mode choke can be left attached. It will be convenient to note that the buffer capacitor $C_{PPB}$ is optional, e.g. when the capacitors C and/or $C_{DM/CM}$ provide sufficient energy storage capability. The PPB converter modules reduce the minimum DC link capacitance value for single-phase operation.

Figures 16A, 16B:
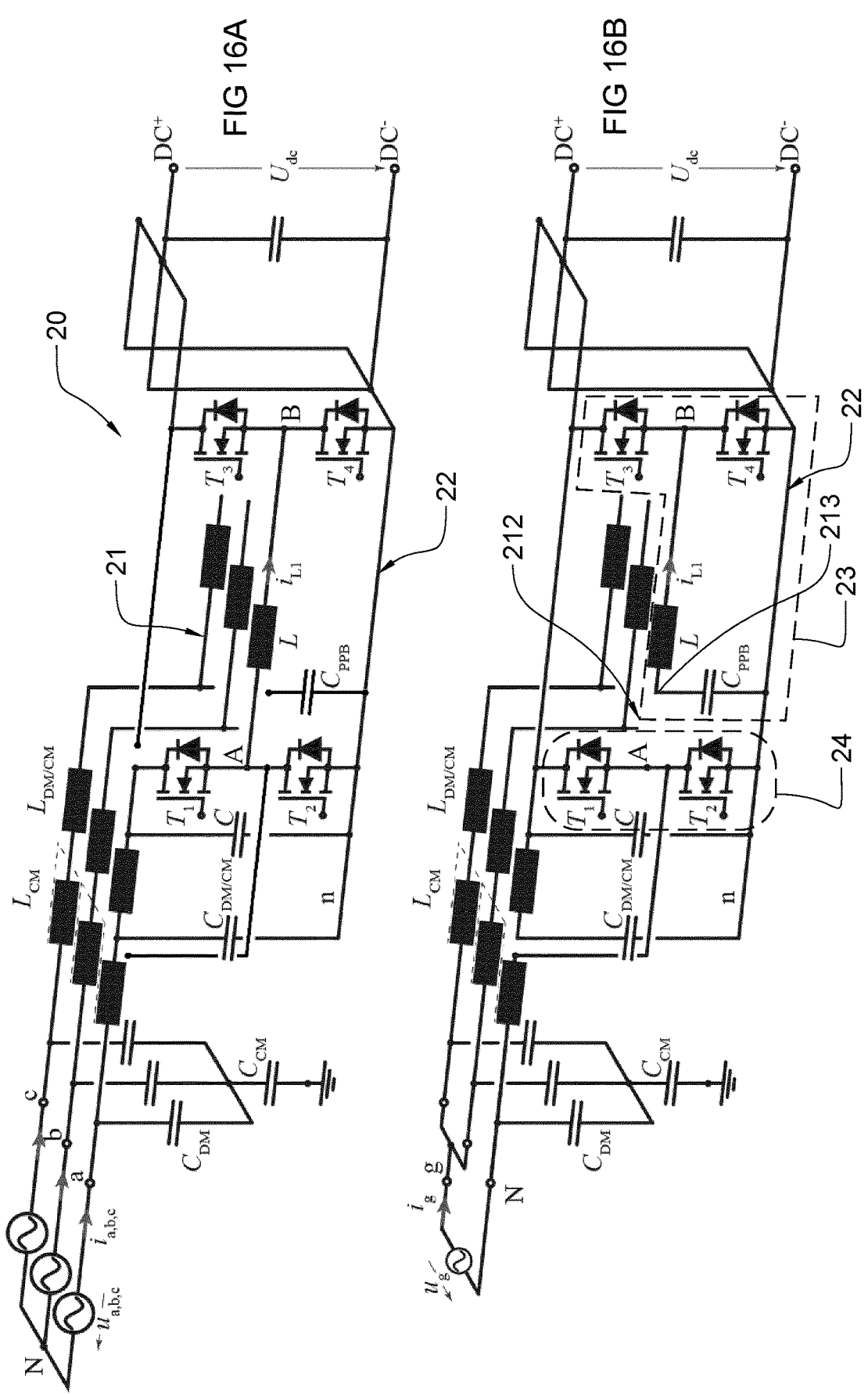
FIG. 16A represents the electrical converter of FIG. 15A, with an alternative configuration of the converter module acting as a power pulsation buffer.
FIG. 16B represents the electrical converter of FIG. 16A connected to a single-phase grid and showing the switchable connections of the converter module acting as the power pulsation buffer.

Referring to FIGS. 16A-B, the converter module 22 acting as PPB is modified by providing a suitable switching circuitry 212 allowing in single-phase operation to disconnect switch node B from switch node A while operably connecting the buffer capacitor $C_{PPB}$ to switch node B. In particular, the switching circuitry 212 is configured to disconnect switch node A from the respective terminal 213 of inductor L while connecting terminal 213 to $C_{PPB}$. The switching circuitry 212 is advantageously further configured to connect the bridge-leg $T_1/T_2$ across the positive and negative DC link rails p and n, while the switch node A is connected to the neutral terminal N. By so doing, converter module 22 is split such that only the boost stage 13 acts as a PPB 23 (now with a PPB voltage strictly below the DC link voltage). Advantageously, the bridge-leg $T_1/T_2$ acts as an unfolder circuit 24, allowing to parallel the converter modules 21 parallel connected to terminal g, and which are hence equally sharing the grid current.

It will be convenient to note that the converter modules 21 and possibly 22 referenced in FIGS. 15A-B and 16A-B can refer to single converter modules as the converter modules 11 described previously, or alternatively can refer to groups 101-103 and 104-105 of converter modules as described in any of the above embodiments. In a particularly advantageous embodiment, the 4/2 converter module configuration as described in relation to FIGS. 12A and 12B can be adapted such that one of the four group 105 converter modules 11 is used as a PPB. Hence, a configuration with three group 105 converter modules, two group 104 converter modules and one PPB module is obtained in single-phase operation, while all six converter modules 11 would be available for being assigned to groups 101-103 in three-phase operation.

It will be convenient to note that in both single- and three-phase operation the resulting grid currents do not necessarily need to be in phase with the respective grid voltages and the electrical converter according to aspects of the present disclosure can also be employed in Static VAR Compensator (SVC) applications.

The electrical converter as described herein can be operated as inverter, both for three-phase and single-phase operation, with a similar control structure as described above. Furthermore, bidirectional power flow through the electrical converter is possible, allowing it to be used for power injection into the AC grid.

Figure 17:
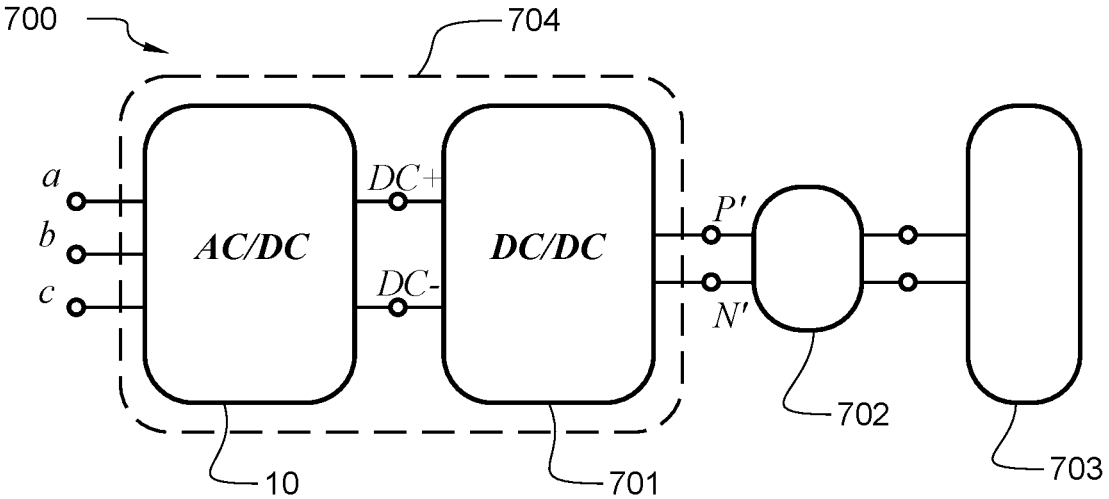
FIG. 17 represents a battery charging system comprising an electrical converter as described herein.

Referring to FIG. 17, a battery charging system 700 comprises a power supply unit 704. The power supply unit 704 is coupled on one side to the AC grid through terminals a, b, c and on the other side (at terminals P', N') to an interface 702, e.g. comprising a switch device, which allows to connect the power supply unit 704 to a battery 703. The power supply unit 704 comprises any one of the electrical converters, e.g. converter 10, as described hereinabove and can comprise a further converter stage 701, which in the present system is a DC-DC converter. The power supply unit 704, e.g. the converter stage 701, can comprise a pair of coils which are inductively coupled through air (not shown), such as in the case of wireless power transfer. Alternatively, the DC-DC converter stage 701 can comprise or consist of one or more possibly isolated DC-DC converters. In some cases, the interface 702 can comprise a plug and socket, e.g. in wired power transfer. Alternatively, the plug and socket can be provided at the input (e.g., at nodes a, b, c).

Another possible application of electrical converters according to the present disclosure is as a traction inverter of an electric motor drive system.

The invention claimed is:

1. An electrical converter (10, 20) for converting between an AC signal and a DC signal, the electrical converter comprising:

a plurality of AC terminals (a, b, c, g, N), a first and a second DC terminal (DC$^+$, DC$^-$), a plurality of converter modules (11, 21, 22), wherein each of the plurality of converter modules comprises:

an AC node (a$_1$, 111), a first capacitor (C), wherein the AC node (a$_1$, 111) is connected to a first terminal of the first capacitor and the second DC terminal (DC$^-$) is connected to a second terminal of the first capacitor opposite the first terminal, such that the second DC terminal forms a common node of the first capacitors (C) of the plurality of converter modules, a first converter stage (12) comprising a first switch node (A), a first active semiconductor switch (T$_1$) connecting the first terminal of the first capacitor to the first switch node (A) and a second active semiconductor switch (T$_2$) connecting the second terminal of the first capacitor to the first switch node (A), a second converter stage (13) comprising a second switch node (B), a third active semiconductor switch (T$_3$) connecting the first DC terminal to the second switch node (B) and a fourth active semiconductor switch (T$_4$) connecting the second DC terminal to the second switch node (B), a first inductor (L), wherein the first and second switch nodes are connected to opposite terminals of the first inductor, wherein a connection between the AC nodes (a$_1$, 111) of the plurality of converter modules and the plurality of AC terminals is reconfigurable allowing the electrical converter to operate according to a first mode of operation configured to convert between a first AC signal having a first plurality p$_1 \geq 2$ of phase voltages and the DC signal and according to a second mode of operation configured to convert between a second AC signal having a single-phase voltage and the DC signal, such that the plurality of converter modules (11, 21, 22) contributing to converting between the first AC signal and the DC signal in the first mode of operation contribute to conversion between the second AC signal and the DC signal or to an active capacitive energy storage (C$_{PPB}$) in the second mode of operation, wherein the plurality of converter modules comprise at least p$_1$k converter modules, k being a positive integer equal to or larger than two, wherein in the first mode of operation, the p$_1$k converter modules are grouped in p$_1$ first groups (101, 102, 103), and wherein in the second mode of operation, the p$_1$k converter modules are rearranged in two second groups (104, 105) with a larger number of the plurality of converter modules assigned to a first one (105) of the two second groups and with at least two of the plurality of converter modules assigned to a second one (104) of the two second groups, wherein the electrical converter is configured to operate multiple converter modules assigned to a same group of the first groups and the second groups in parallel, wherein the second mode of operation comprises a boost mode of operation in which the electrical converter is configured to operate the plurality of converter modules assigned to the first one (105) of the two second groups via pulse width modulation, and to operate the plurality of converter modules assigned to the second one (104) of the two second groups according to an unfolder operation, such that the first active semiconductor switch (T$_1$) is switched to clamp the first switch node (A) to the respective AC node and the third active semiconductor switch (T$_3$) and one or both of the second and the fourth active semiconductor switches (T$_2$, T$_4$) are switched to clamp the second switch node (B) alternatingly to respectively the first and the second DC terminal at half a fundamental period of the second AC signal.

2. The electrical converter of claim 1, wherein the second mode of operation comprises a buck mode of operation in which the electrical converter is configured to operate the plurality of converter modules assigned to the second one (104) of the two second groups according to the unfolder operation when a voltage across the respective first capacitors (C) is smaller than or equal to a voltage across the first and second DC terminals (U$_{dc}$), and to operate the plurality of converter modules assigned to the second one (104) of the two second groups via pulse width modulation when the voltage across the respective first capacitors (C) exceeds the voltage across the first and second DC terminals (U$_{dc}$).

3. The electrical converter of claim 2, wherein in the buck mode of operation, the electrical converter is configured to operate the plurality of converter modules assigned to the first one (105) of the two second groups in a clamped mode such that the first active semiconductor switch (T$_1$) is switched to clamp the first switch node (A) to the respective AC node and the fourth active semiconductor switch (T$_4$) is switched to clamp the second switch node (B) to the second DC terminal.

4. The electrical converter of claim 1, wherein p$_1 \geq 3$.

5. The electrical converter of claim 1, wherein the first groups (101, 102, 103) have equal number of converter modules (11, 21).

6. The electrical converter of claim 1, wherein the second AC signal has a single-phase voltage, and wherein the second groups are two (104, 105).

7. The electrical converter of claim 1, further comprising a second capacitor ($C_{dc}$) connected across the first and second DC terminals, wherein the second converter stages of the plurality of converter modules are parallel connected to the second capacitor.

8. The electrical converter of claim 1, further comprising an AC filter (14) connected between the plurality of AC terminals (a, b, c, g, N) and the AC nodes (111), wherein the AC filter comprises a common mode filter comprising a common mode choke ($L_{CM}$).

9. The electrical converter of claim 8, wherein the common mode choke ($L_{CM}$) comprises a branch for each of the plurality of converter modules, wherein the branch is connected or connectable to the AC node (111) of the respective one of the plurality of converter modules.

10. The electrical converter of claim 1, further comprising first switching devices (112) for interconnecting terminals of the first capacitors (C) at a side of the AC node (111) in a reconfigurable manner.

11. The electrical converter of claim 10, wherein the first switching devices (112) are configured to interconnect the terminals of the first capacitors (C) of the converter modules assigned to a same group of the first groups and/or the second groups.

12. The electrical converter of claim 10, further comprising an AC filter (14) connected between the plurality of AC terminals (a, b, c, g, N) and the AC nodes (111), wherein the AC filter comprises a common mode filter comprising a common mode choke ($L_{CM}$), wherein the common mode choke ($L_{CM}$) comprises a branch for each of the plurality of converter modules, wherein the branch is connected or connectable to the AC node of the respective one of the plurality of converter modules, wherein the first switching devices (112) are configured to connect a first number of the branches to a second number of the plurality of converter modules, the first number and the second number being unequal.

13. The electrical converter of claim 1, further comprising a control unit (15), wherein the control unit is configured to operate the first and second active semiconductor switches mutually exclusively via pulse width modulation and the third and fourth active semiconductor switches mutually exclusively via pulse width modulation.

14. The electrical converter of claim 1, further comprising a control unit (15), wherein the control unit is configured to determine a duty cycle ($d_A$, $d_B$) for each of the plurality of converter modules independently based on a first reference voltage ($u^*_{an}$, $u^*_{gn}$) across the respective first capacitor (C).

15. The electrical converter of claim 1, wherein at least one of the plurality of converter modules (22) is configured to be operated as a power pulsation buffer in the second mode of operation, wherein the at least one converter module (21) configured to be operated as a power pulsation buffer is configured to charge and discharge the first capacitor (C) in the second mode of operation.

16. The electrical converter of claim 1, wherein at least one of the plurality of converter modules (22) is configured to be operated as a power pulsation buffer in the second mode of operation, wherein the at least one converter module (21) configured to be operated as a power pulsation buffer further comprises a buffer capacitor ($C_{PPB}$) and a second switching device configured to operably connect the buffer capacitor ($C_{PPB}$) to the at least one converter module (21) in the second mode of operation for charging and discharging the buffer capacitor.

17. The electrical converter of claim 16, wherein the second switching device is configured to connect the buffer capacitor ($C_{PPB}$) parallel to the first capacitor (C).

18. The electrical converter of claim 16, wherein the second switching device (212) is configured to switch connection of a terminal (213) of the first inductor (L) between the first switch node (A) and a terminal of the buffer capacitor ($C_{PPB}$), such that the second converter stage (13) is operable for charging and discharging the buffer capacitor in the second mode of operation.

19. The electrical converter of claim 18, wherein the second switching device (212) is further configured to connect a bridge-leg (24) of the first converter stage (12) between the first and second DC terminals and the first switch node (A) to a respective AC terminal in the second mode of operation.

20. A battery charging system, wherein the battery charging system comprises a power supply, the power supply comprising the electrical converter (10) of claim 1.

\*   \*   \*   \*   \*